United States Patent

Jorritsma

Patent Number: 5,854,424
Date of Patent: Dec. 29, 1998

[54] METHOD OF ESTIMATING TOTAL VOLUME OF AN IRREGULAR WETWELL

[76] Inventor: Johannes N. Jorritsma, 13 Colleen Avenue, Barrie, Ontario, Canada, L4M 2M9

[21] Appl. No.: 55,292

[22] Filed: Apr. 6, 1998

[51] Int. Cl.$^6$ .................................................... G01F 17/00
[52] U.S. Cl. .............................................................. 73/149
[58] Field of Search ............................................... 73/149

[56] References Cited

U.S. PATENT DOCUMENTS

| | | | |
|---|---|---|---|
| 2,792,708 | 5/1957 | Johnston, Jr. et al. | 73/149 |
| 4,455,870 | 6/1984 | Jorritsma | 73/223 |

FOREIGN PATENT DOCUMENTS

| | | | |
|---|---|---|---|
| 1151297 | 8/1983 | Canada . | |
| 61-0075221 | 4/1986 | Japan | 73/149 |

*Primary Examiner*—Robert Raevis
*Attorney, Agent, or Firm*—Shoemaker and Mattare, Ltd.

[57] ABSTRACT

For use with a wetwell having a geometrically regular upper portion and a geometrically irregular lower portion, a method is provided for estimating the volume in the lower portion. Upper and intermediate level sensors are provided in the upper portion of the wetwell, and a lower level sensor is provided in the lower portion. The volume between the intermediate and upper levels is first calculated. Then, the wetwell performs a series of cycles, each allowing the wetwell to fill with liquid between the lower level sensor and the upper level sensor while the pumping means is off or at a low rate, then causing the wetwell to be emptied from the upper level to the lower level by running the pump. During the filling part of each cycle, the time required for liquid to rise between the lower level and the intermediate level is noted, as is the time required for the liquid to rise between the intermediate level and the upper level. If these times are $T_2$ and $T_1$, respectively, the next step is, for each cycle, to multiply the upper volume (that between the intermediate and upper levels) by $T_2/T_1$, thus arriving at an estimate of the lower volume between the lower level and the intermediate level. Each such calculated estimate is stored, and all estimates are averaged to provide a good approximation of the actual volume between the lower and intermediate levels.

3 Claims, 1 Drawing Sheet

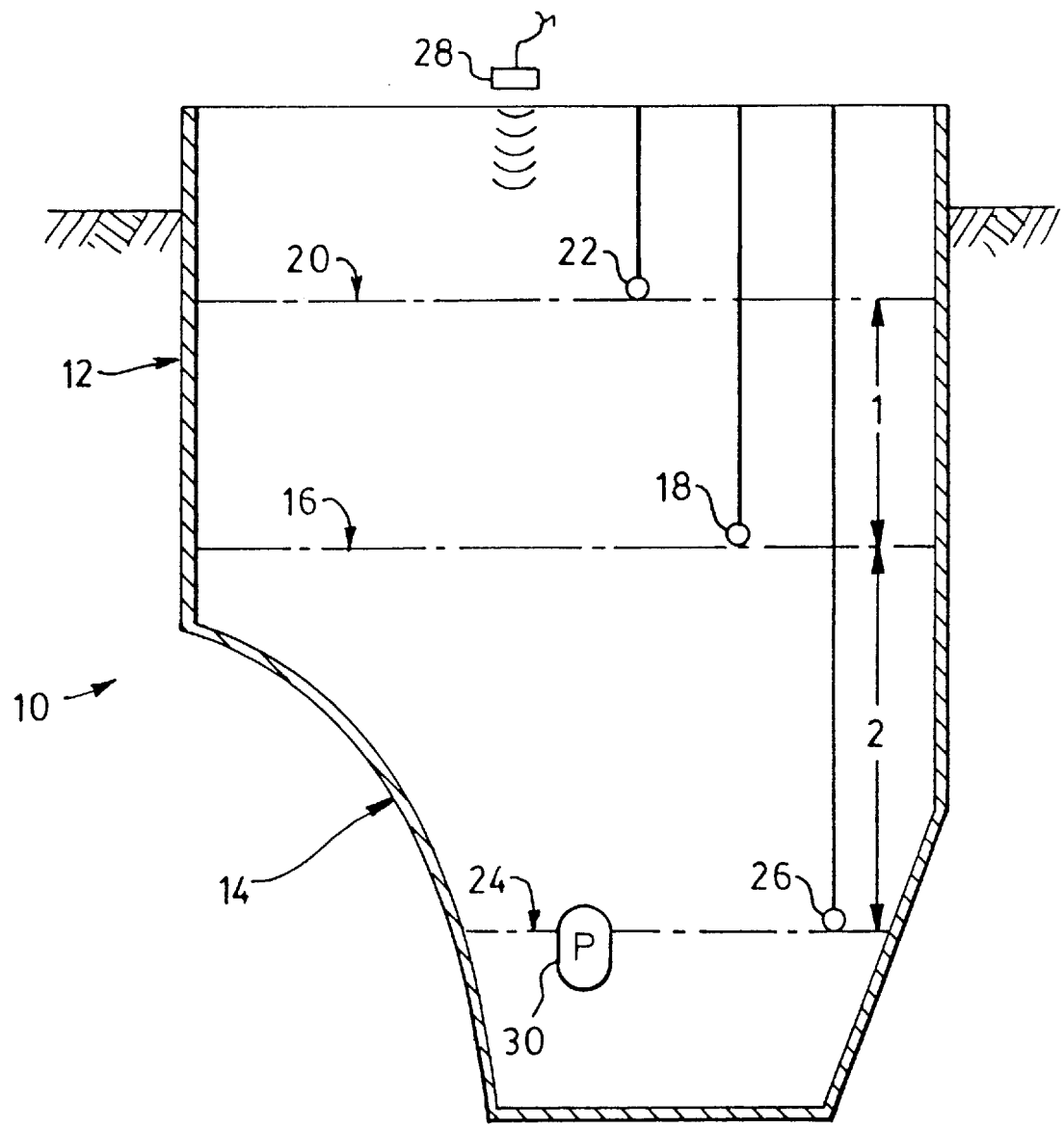

METHOD OF ESTIMATING TOTAL VOLUME OF AN IRREGULAR WETWELL

This invention relates generally to systems which track liquid throughput at a wetwell for purposes of improving the pumping efficiency of the wetwell, and has to do particularly with a method of obtaining a relatively accurate estimate of the size of a geometrically irregular portion of the wetwell, so long as another portion is geometrically regular and has a volume which is easily calculated by multiplying its cross-sectional area by a predetermined vertical distance.

BACKGROUND OF THIS INVENTION

In my U.S. Pat. No. 4,455,870, issued Jun. 26, 1984 and entitled "Method and Apparatus for Determining Liquid Flow Rates" and my Canadian patent 1,151,297, issued Aug. 31, 1993 for "Method and Apparatus for Determining Liquid Flow Rates", it is necessary to program, into a suitable calculating device, two volumes which together constitute the volume of the wetwell.

When a portion of a wetwell (typically the bottom portion) is geometrically irregular, it is not possible by taking measurements of the irregular portion to arrive at a reliable estimate of the volume concerned. This may lead the operator to simply guess at the irregular portion of the volume, or to estimate it "by eye". In the above-mentioned prior developments, any significant error in "guessing" the total volume can render the system inaccurate, at the very least, and inoperative, at worst.

GENERAL DESCRIPTION OF THIS INVENTION

In view of the problem described above, it is an object of an aspect of this invention to provide a method by which, so long as the wetwell contains at least one portion which is relatively regular in the geometric sense, so that its volume can be accurately calculated, it is possible to get a highly reliable estimate of the volume of a geometrically irregular portion of the wetwell.

More particularly, this invention provides, for use in a system which tracks liquid throughput at a wetwell for purposes of improving the pumping efficiency of the wetwell, the wetwell including pumping means and having:

a) a geometrically regular upper portion defining, between an upper level sensor means and an intermediate level sensor means, a first volume which is easily calculated from its geometry, and b) a geometrically irregular lower portion defining, between said intermediate level sensor means and a lower level sensor means, a second volume which is not easily calculated from its geometry;

a method of estimating said second volume, comprising:

A) calculating the said first volume by multiplying the cross-sectional area of the upper portion by the vertical distance separating the intermediate level sensor means and the upper level sensor means;

B) performing a series of cycles each consisting of allowing the wetwell to fill with liquid between the lower level sensor means and the upper level sensor means while the pumping means is off or is set at a consistent lower rate, then causing the wetwell to be emptied from the upper level sensor means down to the lower level sensor means by running the pumping means;

C) during the filling part of each cycle, noting the time $T_2$ required for the liquid to rise between the lower level sensor means and the intermediate level sensor means, and the time $T_1$ required for the liquid to rise between the intermediate level sensor means and the upper level sensor means;

D) for each cycle, multiplying the said first volume by the expression $T_2/T_1$, this being the equivalent of dividing the first volume by $T_1$ to get the inflow rate and then multiplying said rate by $T_2$, thereby to arrive at an estimate of the second volume;

E) storing each calculated estimate of the second volume; and

F) averaging said estimates to provide a good approximation of the actual second volume.

GENERAL DESCRIPTION OF THE DRAWING

The single FIGURE is a somewhat schematic vertical sectional view through a wetwell which includes a geometrically regular upper portion and a geometrically irregular lower portion.

DETAILED DESCRIPTION OF THE DRAWING

As can be seen in the drawing, a wetwell shown generally at the numeral 10 includes:

a) a geometrically regular upper portion 12, and b) a geometrically irregular lower portion 14.

Let us assume that the upper portion 12 is of circular horizontal section. Defined within the upper portion 12 is an intermediate level 16 as determined by an intermediate level sensor 18, and an upper level 20 as determined by an upper level sensor 22.

Within the lower portion 14 there is defined a lower level 24 as determined by a lower level sensor 26.

The sensors 18, 22 and 26 may take the form of several float switches, or alternatively, the installation may include an acoustic apparatus shown schematically at 28, and capable of sending signals toward the surface of a liquid within the wetwell 10, measuring the time taken for the echo of each signal to return. In this instance, the acoustic apparatus would constitute all of the sensor means 18, 22 and 26.

The wetwell 10 further includes pumping means 30.

The present method allows a relatively accurate estimate of the volume lying between the levels 24 and 16. This method includes the following steps:

A) the volume lying between the intermediate level 16 and the upper level 20 is first calculated, by multiplying the cross-sectional area of the upper portion 12 by the vertical distance separating the levels 16 and 20.

B) next, a series of cycles is performed, each consisting of allowing the wetwell 10 to fill with liquid between the lower level 24 and the upper level 20 while the pumping means 30 is off or is set at a consistent lower rate, then causing the wetwell to be emptied from the upper level 20 down to the lower level 24 by running the pumping means 30.

C) during the filling part of each cycle, a note is made of the time $T_2$ required for the liquid to rise between the lower level 24 and the intermediate level 16, and the time $T_1$, required for the liquid to rise between the intermediate level 16 and the upper level 20.

D) for each such cycle, the first volume (that lying between the levels 16 and 20) is multiplied by the expression $T_2/T_1$, which is the equivalent of dividing the first volume (between levels 16 and 20) by $T_1$ to get the inflow rate and then multiplying that rate by $T_2$. This procedure arrives at an estimate of the second volume.

E) each calculated estimate of the volume between levels 24 and 16 is then stored, for example in the electronic or magnetic memory of a computer.

F) finally, the said estimates are averaged to provide an approximation of the actual second volume.

Thus, even though the inflow rate into the wetwell 10 typically changes over time, such that small errors may appear in the calculated volume of the wetwell lying between the levels 24 and 16, such errors would tend to cancel out over a long period of time, which would mean that the estimated volume lying between levels 24 and 16 would tend to "drift" closer and closer to the actual value, as more and more estimates were taken into account.

It should be pointed out that, although step B) above would normally be carried out while the pumping means is shut off entirely, the method of this invention would nonetheless function correctly even with the pumping means running, so long as it does not prevent the filling up of the wetwell, and so long as it operates at a consistent (unchanging) rate.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. For use in a system which tracks liquid throughput at a wetwell for purposes of improving the pumping efficiency of the wetwell, the wetwell including pumping means and having:

a) a geometrically regular upper portion defining, between an upper level sensor means and an intermediate level sensor means, a first volume which is easily calculated from its geometry, and b) a geometrically irregular lower portion defining, between said intermediate level sensor means and a lower level sensor means, a second volume which is not easily calculated from its geometry;

a method of estimating said second volume, comprising:

A) calculating the said first volume by multiplying the cross-sectional area of the upper portion by the vertical distance separating the intermediate level sensor means and the upper level sensor means;

B) performing a series of cycles each consisting of allowing the wetwell to fill with liquid between the lower level sensor means and the upper level sensor means while the pumping means is off or is set at a consistent lower rate, then causing the wetwell to be emptied from the upper level sensor means down to the lower level sensor means by running the pumping means;

C) during the filling part of each cycle, noting the time $T_2$ required for the liquid to rise between the lower level sensor means and the intermediate level sensor means, and the time $T_1$ required for the liquid to rise between the intermediate level sensor means and the upper level sensor means;

D) for each cycle, multiplying the said first volume by the expression $T_2/T_1$, this being the equivalent of dividing the first volume by $T_1$ to get the inflow rate and then multiplying said rate by $T_2$, thereby to arrive at an estimate of the second volume;

E) storing each calculated estimate of the second volume; and

F) averaging said estimates to provide a good approximation of the actual second volume.

2. The method claimed in claim 1, in which each said sensor means is constituted by a float switch.

3. The method claimed in claim 1, which includes an acoustic apparatus above the liquid surface which sends signals toward said surface and measures the time taken for the echo of each signal to return, whereby the acoustic apparatus constitutes all of the said sensor means.

* * * * *